(12) United States Patent
Bredow et al.

(10) Patent No.: US 6,545,607 B2
(45) Date of Patent: Apr. 8, 2003

(54) REMOTE CONTROL SYSTEM PARTICULARLY FOR REMOTELY CONTROLLING INDUSTRIAL EQUIPMENT

(75) Inventors: Wolfgang Bredow, Niefern-Ouschelbronn (DE); Thomas Burchard, Pforzheim (DE); Thomas Haug, Kieselbronn (DE)

(73) Assignee: Integrated Electronic Systems !SYS Consulting GmbH, Oelbronn-Duerrn (DE)

( * ) Notice: Subject to any disclaimer, the term of this patent is extended or adjusted under 35 U.S.C. 154(b) by 0 days.

(21) Appl. No.: 09/860,782

(22) Filed: May 21, 2001

(65) Prior Publication Data

US 2002/0036568 A1 Mar. 28, 2002

(30) Foreign Application Priority Data

May 20, 2000 (DE) .......................................... 100 25 131

(51) Int. Cl.$^7$ ............................................... G08B 23/00
(52) U.S. Cl. ............................... 340/573.1; 340/573.5; 340/576
(58) Field of Search .............................. 340/573.1, 576, 340/575, 439, 573.5

(56) References Cited

U.S. PATENT DOCUMENTS

| | | | | |
|---|---|---|---|---|
| 4,928,090 A | * | 5/1990 | Yoshimi et al. ............. | 340/575 |
| 5,488,353 A | * | 1/1996 | Kawakami et al. ......... | 340/576 |
| 5,694,116 A | * | 12/1997 | Kojima ........................ | 340/576 |
| 5,907,282 A | * | 5/1999 | Tuorto et al. ................ | 340/576 |
| 5,942,979 A | * | 8/1999 | Luppino ...................... | 340/576 |

FOREIGN PATENT DOCUMENTS

| | | |
|---|---|---|
| DE | 41 05 035 | 8/1992 |
| DE | 195 15 123 | 8/1996 |
| DE | 198 18 263 | 10/1999 |

* cited by examiner

Primary Examiner—Daniel J. Wu
Assistant Examiner—Son Tang
(74) Attorney, Agent, or Firm—Browdy and Neimark, P.L.L.C.

(57) ABSTRACT

A remote control system, particularly for remotely controlling industrial equipment, has a sensor that detects the operator's safety-relevant medical data and transmits them as a control signal to a control circuit in a transmitter or receiver. The control circuit triggers a predefinable control sequence when the value of the control signal exceeds or falls below at least one predefinable value. A malfunction, especially of the "human component" of the total system, can be reliably detected as soon as it becomes safety relevant, i.e., as soon as there is a danger that the operator might no longer be able to control the industrial equipment properly and reliably with the remote control system.

15 Claims, 1 Drawing Sheet

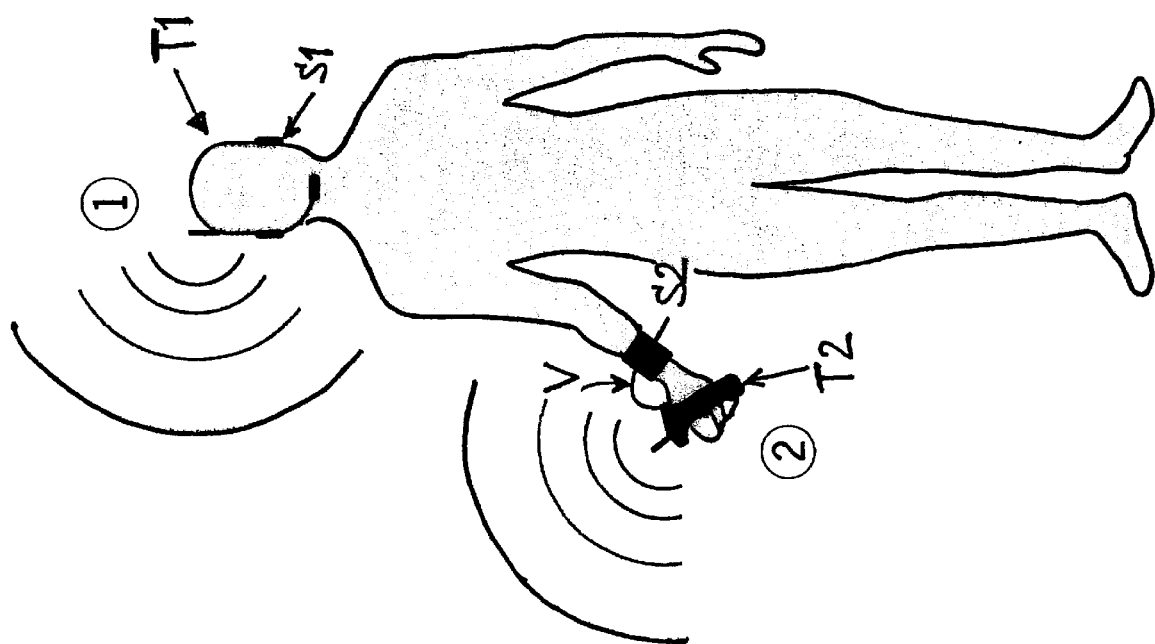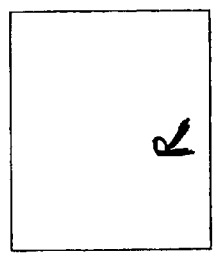

REMOTE CONTROL SYSTEM PARTICULARLY FOR REMOTELY CONTROLLING INDUSTRIAL EQUIPMENT

BACKGROUND OF THE INVENTION

The present invention relates to remote control systems, particularly for controlling industrial equipment.

Known remote control systems of this class generally consist of a transmitter unit that is operated by a human operator and a receiver unit on the industrial equipment to be controlled, e.g., a crane, to which control signals from the control unit are transmitted by wire or wireless, particularly by radio. The receiver unit then converts the received control signals into the desired movements of the controlled industrial equipment.

The controlled industrial equipment consists largely of equipment that must be controlled in a very safety-oriented manner since, if controlled incorrectly, it can cause considerable damage, for example because of its size or because of the objects to be moved. It is therefore known to provide an "emergency off switch" in remote control systems of this type, which permits the operator to quickly terminate the controlled movement of the industrial equipment once an undesired operation has been detected, or to at least place the equipment into a waiting state until the cause of the undesired control or undesired movement has been determined.

This method of operation is reasonably reliable. However it presupposes that the operator is able to recognize a dangerous situation and activate the emergency off switch on the transmitter quickly enough. Known methods thus have two significant shortcomings:

Malfunctions of the human component in the "human-machine" system are not detected, i.e., sudden health-related reactions by the operator, be it with or without the influence of the detected false operation of the controlled industrial equipment, can possibly prevent a timely activation of the emergency off switch and imminent damage may thus not be prevented in a timely or reliable manner.

Furthermore, the known system depends on the emergency off switch being an easily accessible part on the operating device, i.e., essentially depends on the operator holding the operating device in his hand.

Particularly in the case of radio remote control of industrial equipment, it is now also conceivable, however, to forgo the use of such a hand-held operating device and to have a voice-activated control, for which the transmitter does not necessarily need to be housed inside a hand-held operating device or may be eliminated completely.

BRIEF SUMMARY OF THE INVENTION

The invention provides a novel control system that is particularly safety relevant and that makes control information available even when an emergency off switch in its classic form cannot be activated.

This and other objects are achieved according to the invention by a remote control system comprising: a sensor that detects an operator's safety-relevant medical status and transmits data representing that status as a control signal; and a control circuit that receives the data and responds to data values indicating an inability of the operator to perform a control function to trigger a predefined control sequence.

It should thus be seen as an underlying concept of the present invention that even a malfunction of the "human component" in the overall system will be reliably detected as soon as it becomes safety relevant, i.e., as soon as there is a danger that the operator might no longer be able to control the industrial equipment properly and reliably with the remote control system.

This basic principle may also be used in classic hand-held operating devices; however, it also ensures a reliable emergency off function in conjunction, for example, with headsets for the voice-activated control of the given industrial equipment.

Depending on the chosen design of the transmitter operating element, a sensor that is used to detect the operator's state of health may be installed either directly in a housing together with the other electronic transmitter components, or it may be disposed separately at a location where a particularly reliable detection of medical information regarding the operator's state of health is possible, particularly medical information that represents a measure for the operator's current stress situation. The sensor may thus be housed inside a component that is spatially separate from the transmitter unit, e.g., in a cuff fastened around the operator's wrist that measures the operator's pulse rate, either continuously or at predefinable intervals.

According to certain embodiments of the invention, the system may be provided with a memory unit storing the medical data that is produced over at least one predefinable interval, and a computing element that obtains from the stored medical data information that is used to individually cause at least one of the control signal and the data values to be effective for activation of the predefined control sequence in order to conform the system to the medical status of a given operator. These components may be installed in the transmitter or the receiver.

BRIEF DESCRIPTION OF THE DRAWING

The sole drawing Figure is a pictorial view showing two exemplary embodiments of the invention.

DETAILED DESCRIPTION OF THE INVENTION

Referring to the sole Figure, a system according to the invention is composed essentially of a transmitter device T and a sensor S.

A first embodiment 1 includes a transmitter device in the form of a headset T1, which incorporates, in a known manner, a mouthpiece for receiving voice control commands and in which, together with the usual electronic components, a control circuit and an antenna are provided whereby the suitably converted voice commands are transmitted to a receiver R. In the second embodiment 2, the remote control transmitter is provided in the form of a hand-held operating device T2, in which the electronic components are housed in the usual manner, together with the control circuit.

In both exemplary embodiments, the control circuit serves to process a control signal indicative of the state of health of the operator, as supplied by a sensor S1 or S2. In the first embodiment 1, sensor S1 is housed in headset T1 and in the second embodiment 2, sensor S2 is designed as a wrist band and connected via a signal transmitting line V to the hand-held operating device T2 or to the control circuit contained therein.

The association of the sensor S and transmitter T is, of course, variable. For example, a sensor S can be disposed in the handle surface of hand-held operating device T2 or can be installed in a wrist band and connected by a connecting line to a headset in the case of a voice-activated control unit as provided in headset T1.

Generally it may thus be stated that the transmission of information from the sensor S to the control circuit may be implemented through a number of options: either via a spatial grouping and integration of the sensor into the given transmitter unit if it is possible to detect a health-relevant medical parameter there, or by transmitting the control signal from a sensor disposed in a medically suitable location, either via a connecting line or via a separate wireless connection, to the given selected operating device.

The inventive solution thus permits an automatic monitoring of the operator's state of health, as it relates to his ability to control the equipment, through information comprising particularly those medical parameters that are typical for an operator's stress situations. In other words, the previously established function mode of the control unit for the industrial equipment is maintained only as long as the medical data reported, recorded and transmitted to the control circuit by the sensor about the given operator remain within a certain tolerance range or below a tolerance threshold, or optionally also a combination of the two. These tolerance ranges/thresholds, according to an improved version of the invention, may also be "learned", so that the remote control can adapt to a given operator's individual "stress profile." When the tolerance range and/or threshold is exceeded, which generally occurs in a situation that is unusual for the operator, a predefinable control sequence of the control transmitter is triggered. Such a sequence may consist of inducing a classic emergency-off function or other operational sequences, such as stand-by, sounding of an alarm, or the like, either individually or also together.

In various embodiments of the invention sensor S1 or S2 may be a conventional device for measuring pulse rate, the conductivity of an area of the skin, blood pressure, etc.

The memory unit can be used to store the medical data of individual operators that can be obtained either by monitoring medically relevant characteristics of an individual operator, such as one or more vital signs, blood pressure, etc., for a predefined period of use of the system, or by providing already known data to the memory unit. For example, if an individual operator has an average value of blood pressure of 140/90, the computing element can be configured to provide the control signal if the measured, actual blood pressure of the individual operator exceeds 180/100, which may be interpreted as indicative of an abnormal health conditions of the operator. Thus, if this individual threshold is exceeded, the predefined control sequence is activated, such as generation of an "emergency off" signal.

This application relates to subject matter disclosed in German Application Number 100 25 131.5, filed on May 20, 2000, the disclosure of which is incorporated herein by reference.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . ." and "means for . . .", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A remote control system for remotely controlling industrial equipment, said system comprising:
    a transmitter for wireless transmission of signals;
    a receiver remote from said transmitter for wireless reception of signals transmitted by said receiver;
    a control circuit associated with said transmitter; and
    a sensor that detects an operator's safety-relevant medical data and transmits that data as a control signal to said control circuit;
    wherein said control circuit receives the data from said sensor and responds to data values indicating an inability of the operator to perform a control function of the industrial equipment by triggering a predefined control sequence in said transmitter to induce a specific function of the industrial equipment controlled by signals from said transmitter.

2. The system of claim 1, wherein said control circuit is disposed in said transmitter.

3. The system according to claim 1, wherein said sensor and said control circuit are part of said transmitter constructed to be in physical contact with the operator.

4. The system according to claim 3, wherein the transmitter is part of a hand-held operating device.

5. The system according to claim 3, wherein the transmitter is part of a headset for voice-activated control.

6. The system according to claim 1, wherein said control circuit is disposed in said transmitter, said sensor is part of a component that is separate from the transmitter and is constructed to be in physical contact with the operator, and the medical data is transmitted via a connecting line to the transmitter.

7. The system according to claim 6, wherein the transmission takes place by infrared, radio frequency, or inductively.

8. The system according to claim 1, wherein the sensor includes a device that measures the operator's pulse rate and derives the control signal therefrom.

9. The system according to claim 1, wherein the sensor includes a device that measures the conductivity of an area of an operator's skin and derives the control signal therefrom.

10. The system according to claim 1, wherein the sensor includes a device that measures the operator's blood pressure and derives the control signal therefrom.

11. The system according to claim 1, wherein the predefined control sequence comprises one of an activation and deactivation of a function of the transmitter or receiver.

12. The system according to claim 1, further comprising an operating device for controlling the control circuit independently of operation of the sensor, to trigger the predefined control sequence.

13. The system according to claim 1, further comprising a memory unit storing the medical data that is produced over at least one predefinable interval, and a computing element that obtains from the stored medical data information that is used to individually cause at least one of the control signal and the data values to be effective for activation of the predefined control sequence in order to conform the system to the medical status of a given operator.

14. The system according to claim 1, wherein the predefined control sequence effects a deactivation of the transmitter or receiver as an "emergency off" signal.

15. A remote control system for remotely controlling industrial equipment, said system comprising:

a transmitter for wireless transmission of signals;

a receiver for wireless reception of signals transmitted by said receiver;

a control circuit associated with said transmitter;

means for receiving control commands produced by an operator for controlling operation of the industrial equipment and for transmitting corresponding equipment operation control signals to said control circuit; and a sensor that detects an operator's safety-relevant medical data and transmits that data to said control circuit; wherein: said control circuit receives the corresponding equipment operation control signals and the data from said sensor: and said control circuit responds to the equipment operation control signals to cause said transmitter to transmit signals for normal control of the industrial equipment and responds to values of the data transmitted by said sensor indicating an inability of the operator to perform a control function of the industrial equipment by triggering a predefined control sequence in said transmitter to induce a specific function of the industrial equipment controlled by signals from said transmitter.

\* \* \* \* \*